United States Patent [19]
Chou

[11] Patent Number: 5,331,725
[45] Date of Patent: Jul. 26, 1994

[54] ROD CLIP

[75] Inventor: Randolph S. Chou, Taipei, Taiwan

[73] Assignee: Design Ideas, Ltd., Springfield, Ill.

[21] Appl. No.: 922,536

[22] Filed: Jul. 30, 1992

[51] Int. Cl.⁵ .............................................. A44B 21/00
[52] U.S. Cl. ..................................... 24/545; 24/339; 403/391
[58] Field of Search ............... 24/145 H, 129 D, 545, 24/555, 563, 288, 339, 336; 403/391, 397, 389; 411/520; 174/94 R

[56] References Cited

U.S. PATENT DOCUMENTS

| H463 | 5/1988 | Bollens | 24/339 |
|---|---|---|---|
| 2,106,724 | 2/1938 | Cope . | |
| 3,053,930 | 9/1962 | Mallanik et al. . | |
| 3,486,531 | 12/1969 | Nalodka . | |
| 3,636,595 | 1/1972 | Wines . | |
| 4,002,349 | 1/1977 | Dopp . | |
| 4,688,961 | 8/1987 | Shioda et al. . | |
| 4,765,495 | 8/1988 | Bisk . | |
| 4,774,792 | 10/1988 | Ballance . | |

Primary Examiner—James R. Brittain
Attorney, Agent, or Firm—Saidman Design Law Group

[57] ABSTRACT

A clip is adapted to hold a pair of cylindrical members in spaced juxtaposition. The clip comprises an integral body defining a pair of internal circular recesses, a central chamber connecting the recesses, and an opening permitting ingress into the central chamber. The opening has a width less than the diameter of each of said cylindrical members intended to be held therein. The diameter of each recess is slightly less than the diameter of the cylindrical members. When in the recesses, the pair of members are in substantially tangential contact. This orientation of recesses, internal chamber, and opening provides compound forces and plural flexures necessary to overcome in order to attach the clip to the cylindrical members or to detach it from them. This permits the clip to be made more flexible while maintaining a high ability to hold the cylindrical members within the clip.

8 Claims, 1 Drawing Sheet

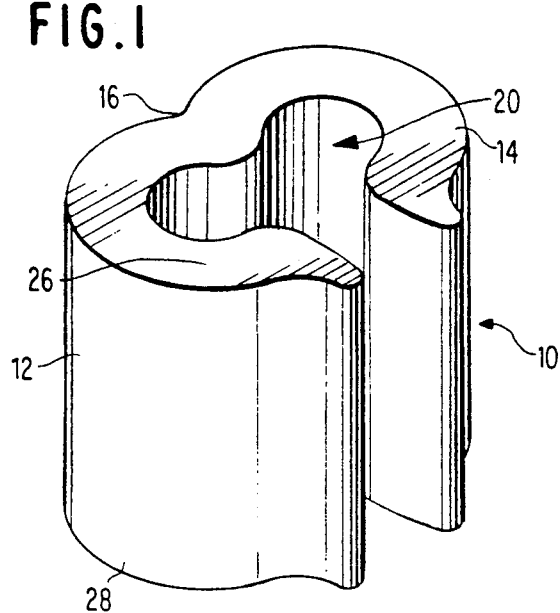
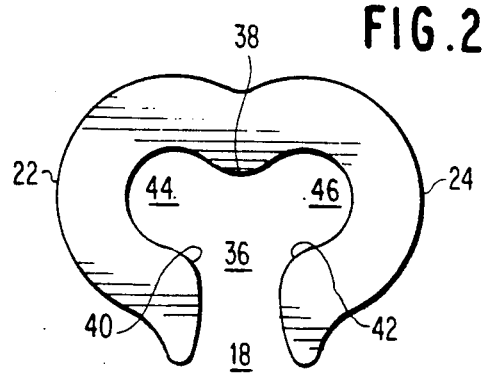
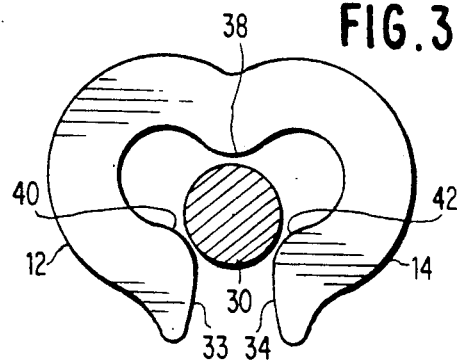
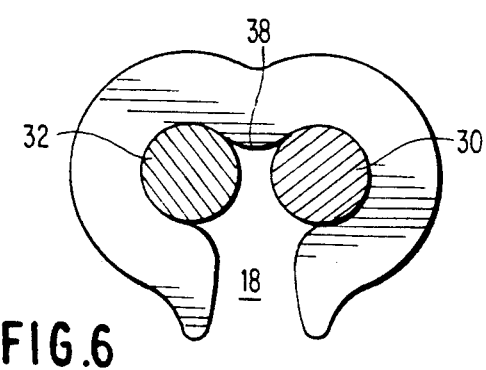
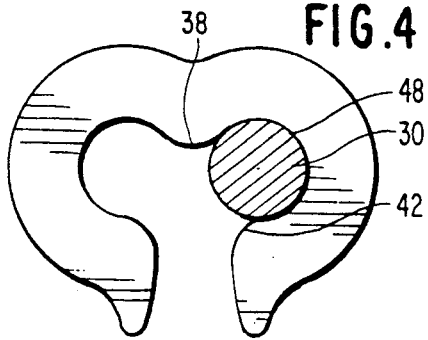
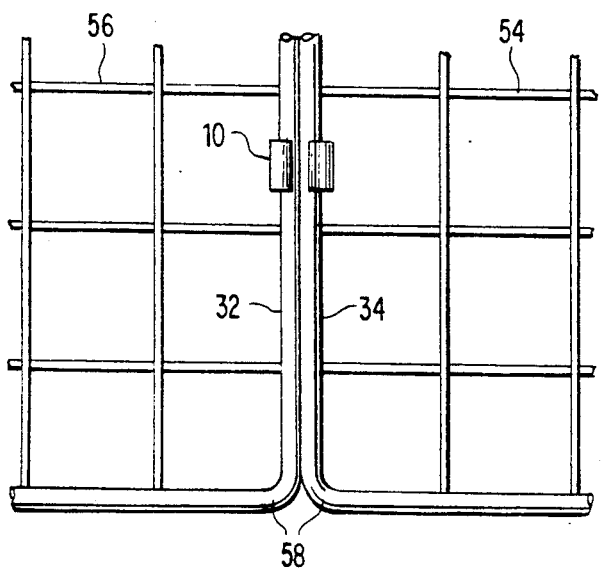
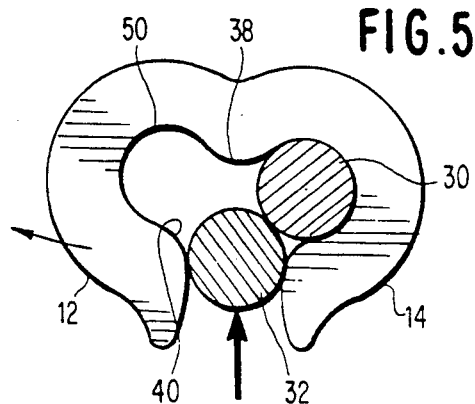

ROD CLIP

BACKGROUND OF THE INVENTION

Field of the Invention

This invention relates to a resilient clip designed to hold two cylindrical members, solid or flexible, in juxtaposition.

Description of Related Art

Clips which have a pair of cylindrical recesses for receiving and holding cylindrical members have been the subject of patents in the past. A representative sampling follows:

U.S. Pat. No. 2,106,724, issued to Cope on Feb. 1, 1938, discloses a resilient, one piece clip for holding electrical conductors, said clip consisting of a base with three upright walls forming two cylindrical recesses. Two elongated openings having widths which are smaller than the diameter of the conductors receive the respective conductors therein. The walls adjacent the openings may be bevelled (FIG. 24) to facilitate entry of the conductors. The resiliency of the material applies forces to hold the conductors in the recesses.

U.S. Pat. No. 3,053,930, issued to Mallanik et al on Sep. 11, 1962, discloses a non-resilient, E-shaped electrical connector in which the central wall is relieved at its base to provide it with flexibility. The outer walls are deformed inwardly to clamp the conductors.

U.S. Pat. No. 3,486,531, issued to Nalodka on Dec. 30, 1969, discloses a spring metal clip consisting of a pair of semi-cylindrical wall portions joined by a flat body portion. The diameters of the semi-cylindrical recesses are slightly smaller than the cylindrical hydraulic tubes intended to be held therein.

U.S. Pat. No. 3,636,595, issued to Wines on Jan. 25, 1972, discloses a clip having two side-by-side U-shaped sockets. The clip is made from any suitable resilient material such as spring steel or plastic. Rounded edges border the open ends of the U-shaped sockets. The clip is designed to receive and coil flexible linear materials, such as a garden hose, an electrical cable, and vinyl tubing.

U.S. Pat. No. 4,002,349, issued to Dopp on Jan. 11, 1977, discloses a clip for holding a ski pole and a pair of skis in juxtaposed relationship. The clip is made of elastic material, such as Nylon or polyurethane and is shaped to form two oppositely directed openings.

U.S. Pat. No. 4,002,349, issued to Shioda et al on Aug. 25, 1987, discloses a single U-shaped clip having outwardly flared arms. The base of the clip is shaped to snap-fit with a similar base on another clip to provide two adjacent clips which will hold two wires in closely spaced relationship. The clips are made of flexible plastic.

U.S. Pat. No. 4,765,495, issued to Bisk on Aug. 23, 1988, discloses an E-shaped clip made of resilient plastic, such as polypropylene. Two cylindrically shaped recesses are defined by the three arms of the clip. The two openings into the recesses are slightly smaller than the diameter of the rod-like members held therein. The clips are used to fasten together the edge rods of generally planar panels made of wire mesh to construct storage bins, shelves, etc.

U.S. Pat. No. 4,774,792, issued to Ballance on Oct. 4, 1988, discloses a clip for joining panels having tubular frames. The clip, made of a tough, resilient plastic, includes two C-shaped clips arranged in back-to-back configuration. Outwardly flared arms provide easy ingress.

The prior art, as exemplified by the above patents, had to compromise between two conflicting desiderata, the ease with which the clip is placed on the cylindrical members and the holding ability of the clip. If the clip is to be easily installed on the cylindrical members, it must be flexible enough to be manageable; the more flexible, the easier it is to attach to the members. If it is too flexible, however, the clip will not effectively hold the cylindrical members. On the other hand, if the clip is made rigid enough to have a high holding ability, it is not flexible enough to be easily attached to the cylindrical members. In the past, a compromise had to be struck, and one advantage had to be sacrificed to obtain the other.

OBJECTS AND SUMMARY OF THE INVENTION

The present invention overcomes the difficulties described above by providing a unique clip which has a higher degree of flexibility, thereby increasing the ease of insertion or removal of cylindrical members therefrom, while at the same time having a higher degree of holding ability, as compared with prior art designs.

The present invention accomplishes the above by designing the clip to have an integral, one-piece body, said body defining an internal chamber with a single opening leading into said chamber, said chamber comprising a central chamber and a pair of circular recesses, said recesses being partially bounded by internal walls of said internal chamber, and the peripheral extensions of said circular recesses extending into said central chamber proximate one another, said clip being dimensioned relative to the diameter of the cylindrical members such that said opening has a width smaller than said diameter and the respective diameters of said pair of circular recesses are slightly smaller than said diameter of said cylindrical members.

It is a primary object of the present invention to provide a novel and unique clip which is easy to attach to cylindrical members, which has a high holding ability, and which is easy to remove when desired.

A secondary object of this invention is to provide a novel and unique clip structure having increased flexibility, relative to its holding ability, and increased holding ability, relative to its flexibility, when compared with prior art clips.

BRIEF DESCRIPTION OF THE DRAWINGS

The foregoing and other objects, aspects, uses, and advantages of the present invention will be more fully appreciated as the same becomes better understood from the following detailed description of the present invention when viewed in conjunction with the accompanying drawings, in which:

FIG. 1 is a perspective view which illustrates a preferred embodiment of the present invention;

FIG. 2 is a top view of the inventive clip;

FIG. 3 is a top view of the clip with a cylindrical member, shown in cross-section, partially inserted therein;

FIG. 4 is a top view of the clip with a cylindrical member, shown in cross-section, inserted into one of the recesses formed therein;

FIG. 5 is a top view of the clip with a two cylindrical members, shown in cross-section, inserted therein, one inserted into one of the recesses, and the other partially inserted therein;

FIG. 6 is a top view of the clip with two cylindrical members, shown in cross-section, inserted into both of the recesses formed therein; and FIG. 7 illustrates a use of the present invention.

DETAILED DESCRIPTION OF THE PREFERRED EMBODIMENT

Referring to FIG. 1, a clip 10 is shown in perspective. Clip 10 has an integral structure and is made of a reasonably tough, resilient elastomeric material, preferably Nylon. Clip 10 has sufficient rigidity to maintain its performed shape but sufficient resiliency to flex enough for its intended function, to be detailed below.

Clip 10 has two arcuate arms 12 and 14, joined together at one end at 16 and spaced apart at the other end to define an opening 18. Together arms 12 and 14 enclose an interior chamber 20.

As shown, the two arms form, in cross-section, a generally heart-shaped member having an opening at the bottom of the heart. Although a heart shape is the preferred cross-sectional shape, because it aids in the flexibility of clip 10, the exterior shape of the clip is relatively unimportant. It is the shape of interior chamber 20 which embodies the inventive concepts. Clip 10 could be essentially square in cross-section, for instance, so long as it has the flexibility to provide the functions explained below.

The width of clip 10 as measured from peripheral point 22 to peripheral point 24 (FIG. 2) is preferably approximately the same as the height of clip 10 from top 26 to bottom 28 (FIG. 1). This ratio is desirable but may be varied depending on the environment and application of use of clip 10, as will become apparent to one skilled in the art.

Clip 10 is designed to receive, and to hold firmly in place, a pair of cylindrical members 30 and 32, shown in cross-section in FIGS. 3-6, in closely spaced, juxtapositioned relationship. The nature of cylindrical members 30 and 32 is not a part of the invention and could be any of a variety of members. They may, for example, be solid rods, as in the bordering frame of a generally planar panel, as shown in FIG. 7. In that instance, a plurality of panels can be removably affixed by means of a plurality of clips 10 to construct storage bins, shelves, boxes, portable fences, and other enclosures. Cylindrical members 30 may also be a pair of fishing pole rods, or other pairs of rod-like structures, clipped together for shipment or storage. Electrical conductors, such as the ignition wires extending between the distributor and spark plugs of an automobile, may be selectively held by one or more clips 10 to keep them together, untangled, in a particular orientation relative to the engine. Three or four clips, for instance, can selectively join and space four ignition wires in a variety of orientations, from flat to rectangular. Also, in a cramped environment, clips 10 can be used to permit a plurality of wires to be selectively separated to pass around intervening structures. In short, if two cylindrical members of any usage are desired to be held together in spaced relationship, they can be securely held in place by clips 10.

The body of clip 10 is integrally molded, or otherwise formed, to define an interior chamber 20, shaped substantially as shown. The dimensions of various portions of chamber 20 will be selected in terms of a diameter "D" which will be determined by the diameter of the cylindrical members for which they are intended. The diameter of the cylindrical members desired to be held by clip 10 in any given environment will, of course, be known at that time, and the dimensions of clip 10 will be selected according to the criteria described below to fit that particular diameter. Inasmuch as a specific diameter of use is unknown at this time, reference will be made to generic diameter "D", disclosed for illustration purposes only as the diameter shown for cylindrical member 30.

Turning to FIG. 2, interior chamber 20 is seen to comprise four general areas, opening 18, central chamber 36, and two circular recesses 44 and 46. The boundaries of the general areas are not sharply delineated and tend to overlap in some areas. Having distinctly defined internal areas is not a critical feature of the invention, but rather, chamber 20 is separated into general areas more for purposes of description than of function.

The width of opening 18, when clip 10 is in its unflexed state, is selected to be substantially smaller than the diameter D of member 30. In order to allow member 30 to enter chamber 20 (FIG. 3), arms 12 and 14 will have to flex outwardly. The flexing of clip 10 for this action is distributed over the entire length of clip 10. The force required to insert member 30 into chamber 20 is relatively small, therefore. The ends 33 and 34 of arms 12 and 14, respectively, are curved outwardly to facilitate entry of member 30.

Once beyond opening 18, member 30 rests in central chamber 36 (FIGS. 2-3) loosely contacting the interior walls of chamber 20, against tip 38, arcuate region 40 of arm 12, and arcuate region 42 of arm 14. To remove member 30 from clip 10, a positive force must be applied to the ends of arms 12 and 14 to flex them sufficiently for member 30 to exit via opening 18. Overcoming the elastic forces within clip 10 tending to restore opening 18 to its unflexed state is the first obstacle which must be overcome to attach clip 10 to member 30 or to remove it therefrom.

Circular recesses 44 and 46 are defined within chamber 20 by the interior walls of arms 12 and 14, respectively. Recesses 44 and 46 are not completely enclosed by arms 12 and 14, however. They open into central chamber 36 and the circular periphery of recesses 44 and 46 extend beyond tip 38 and arcuate regions 40 and 42 into central chamber 36. The end points of the walls where the periphery of recesses 44 and 46 are defined by the walls occur where the curvatures of the walls change directions from defining the circular recesses to forming rounded tip 38 and the outwardly flared ends 33 and 34, respectively, of arms 12 and 14. The angle subtended by the interior walls for each recess 44 or 46 is more than 180 degrees but less than 360 degrees, preferably between 270 and 320 degrees. The distance between the end points of recess 44, namely, from tip 38 to arcuate region 40, and the distance between the said end points of recess 46, from tip 38 to arcuate region 42, are each less than the diameter D of member 30.

In order to move member 30 from central chamber 36 into recess 46, as shown in FIG. 4, localized flexing of the circular wall 48 of recess 46 between the end points of recess 46 on tip 38 and arcuate region 42 must occur. The elasticity of the material of clip 10 resists this localized flexing. The elastic force resisting deflection of wall 48 of recess 46 is greater than the elastic force resisting the enlargement of opening 18, because the former is distributed over only said circular wall 48 of recess 46, a smaller portion of clip 10, whereas the latter is distributed over the entire arcuate length of clip 10.

The elastic force tending to maintain the width between tip 38 and arcuate region 42 in its unflexed dimension is, therefore, the second obstacle which must be overcome to attach clip 10 to member 30 or to remove it therefrom. Unlike the prior art referred to above, where only one flexing of the clip is required, insertion of cylindrical member 30 into its recess 46 requires clip 10 to flex twice.

The diameter of recess 46, and of recess 44 also, is slightly less than D. A gripping force is, therefore, applied to member 30 after it has been inserted into recesses 44 or 46.

FIG. 5 shows the initial insertion of a second cylindrical member 32 into clip 10. As seen in FIG. 5, arms 12 and 14 have flexed apart, enlarging opening 18, through which member 32 passes. The progress of member 32 is impeded by the cylindrical surface of member 30, however. Further flexing of clip 10 along the entire length of arm 12 is required for member 32 to snap beyond member 30. This provides a second obstacle to insertion or removal of member 32 into clip 10. And, a third flexing of clip 10, along wall 50 between tip 38 and arcuate region 40, is required to insert member 32 into recess 44, to the orientation shown in FIG. 6. A third obstacle to insertion and removal of member 32 is thereby provided. Thus, compound flexures which provide additive forces are required to be overcome to insert member 32 into recess 44. Of course, the same compound flexures are required to remove member 32 from clip 10.

In the state shown in FIG. 6, cylindrical members 30 and 32 are held essentially only by the gripping force generated by selecting the diameters of recesses 44 and 46 to be slightly less than the diameter D of members 30 and 32. The gripping force is produced by a distributed flexing of arms 12 and 14, i.e., a flexure throughout clip 10, which slightly enlarges opening 18 relative to the unflexed state of clip 10. The strain on clip 10 is minimized, therefore, which tends to promote long life for clip 10.

In order to remove members 30 and 32 from clip 10, however, larger, compound elastic forces must be overcome. When member 32 (or 30) is removed, it must overcome (1) the gripping force due to the flexure the entire length of clip 10, (2) the flexure of wall 50 to permit passage beyond the end points of recess 44, (3) the flexure of arm 12 to permit passage beyond the circular portion of member 30 protruding into central chamber 32, and (4) the elastic force resisting enlargement of opening 18. The resistance against removal of one of the cylindrical members is much greater than the simple resistance provided by prior art clips, which has at most two obstacles to overcome, namely, any gripping force present and the elastic resistance produced by enclosing more than half of the periphery of the circular member in a recess.

The present invention provides the additional forces by the means of the unique design of the clip. Specifically, there is one entrance into the clip, instead of the two separate entrances provided by the prior art. And, the internal chamber includes two circular recesses positioned relative to each other such that the initial movement toward removal of one member causes contact thereof with the other member. The initial forces resisting removal of one of the cylindrical members are compounded by the number of flexures needed to permit the member from exiting from its recess and the initial forces are relatively enlarged due to the localized flexures generating them.

This combination of forces and flexures permits the clip to be made more flexible than a prior art clip having the same degree of holding ability, and the combination permits the clip to be made with more holding ability than prior art clips having the same flexibility. The unique design of the inventive clip further permits a higher degree of flexibility and a higher degree of holding ability to be combined than was possible in the prior art. This is accomplished by selecting the flexibility and elastic forces to both be at the limits the parameters of acceptable ease of handling and desired holding ability.

By judicially choosing values of various parameters, the flexibility or holding power of clip 10 can be controlled. For instance, to decrease the flexibility of clip 10, arms 12 and 14 can be made thicker and the indentation over tip 38 can be eliminated. The walls enclosing each of the recesses 44 and 46 can be extended to subtend more or less of an internal arcuate angle, resulting in the flexure necessary to insert a member into the recess, and its concomitant elastic force, to be increased or decreased, respectively. Likewise, opening 18 can be made smaller or larger, thereby decreasing or increasing the elastic force applied thereto. The selection of values for these and other parameters are within the scope of the invention.

As shown in FIGS. 4–6, the cross-sectional thickness of clip 10 is only slightly less than the diameter of rods 30 and 32. This feature provides a useful function. Relative to the environment of intended use, clip 10 has a substantial size. It is easy to manually manipulate, therefore. A thin, metal clip of similar shape would be much smaller and more difficult to handle, leading to it being dropped or mispositioned more frequently.

FIG. 7 shows one example of a use for clip 10. Two generally planar panels 52 and 54, made of intersecting, stiff wires 56, are bordered by larger rods 58. Two of the rods, equivalent to members 30 and 32, are held next to each other by clip 10. A plurality of clips and panels can be connected to form shelves, boxes, fences, etc.

It is clear from the above that the objects of the invention have been fulfilled.

Obviously, numerous modifications and variations of the present invention are possible in light of the above teachings. It is therefore to be understood that, within the scope of the appended claims, the invention may be practiced otherwise than as specifically described herein.

I claim as my invention:

1. A clip for holding two cylindrical members in spaced juxtaposition, both of said cylindrical members having approximately equal diameters, said clip comprising:

an integral, one-piece body;
said body comprises:
 a pair of arms joined at one end and open at another, said arms defining an internal chamber and a single opening leading into said internal chamber,
 each of said arms having a top surface and a bottom surface, the tops of said arms being coplanar and the bottoms of said arms being coplanar, said internal chamber extending from said tops to said bottoms, and
 each of said arms having a thickness which varies along its length from a minimum at the open ends of said pair of arms to a substantially constant thickness beyond the intersection of said single opening and said internal chamber; and the cross-section of said body being approximately heart-shaped with said opening being located at the externally directed apex of said heart, such that said internal chamber comprises a central chamber and a pair of arcuate recesses, each of said arcuate recesses being partially bounded by internal walls of said internal chamber, and said pair of arcuate recesses having a radius of curvature such that twice said radius of curvature is slightly less than said diameter of said cylindrical members; and said single opening having a width substantially smaller than said diameter of said cylindrical members.

2. A clip as in claim 1 further comprising a rounded tip separating said arcuate recesses.

3. A clip as in claim 1 wherein said body has a pair of ends adjacent said single opening, said ends being rounded and outwardly flared to facilitate entry of said members into said single opening.

4. A clip as set forth in claim 1 wherein the height of said body comprises the elongated length of said internal chamber from said tops to said bottoms and the width of said body comprises the distance across the widest part of said heart, said width and said height being substantially the same dimension.

5. A clip as in claim 1 wherein the angle subtended by said internal walls which partially bound each of said arcuate recesses is between 270 degrees and 320 degrees.

6. A clip as set forth in claim 1 wherein said substantially constant thickness is slightly smaller than said diameter of said cylindrical members.

7. A clip as set forth in claim 1 wherein said body is made of an elastomeric material.

8. A clip as in claim 7 wherein said material is Nylon.

* * * * *